March 7, 1933.  A. F. MOYER  1,900,726
LAWN MOWER
Filed Dec. 20, 1930  3 Sheets-Sheet 1

INVENTOR
AMOS F. MOYER
BY Paul, Paul & Moore
ATTORNEYS

March 7, 1933. A. F. MOYER 1,900,726
LAWN MOWER
Filed Dec. 20, 1930 3 Sheets-Sheet 2

INVENTOR
AMOS F. MOYER
BY
ATTORNEYS

March 7, 1933.  A. F. MOYER  1,900,726

LAWN MOWER

Filed Dec. 20, 1930  3 Sheets-Sheet 3

INVENTOR
AMOS F. MOYER
BY Paul, Paul Kelloway
ATTORNEYS

Patented Mar. 7, 1933

1,900,726

UNITED STATES PATENT OFFICE

AMOS F. MOYER, OF MINNEAPOLIS, MINNESOTA, ASSIGNOR TO TORO MANUFACTURING COMPANY, OF MINNEAPOLIS, MINNESOTA, A CORPORATION OF DELAWARE

LAWN MOWER

Application filed December 20, 1930. Serial No. 503,719.

This invention relates to new and useful improvements in lawn mowers and more particularly to gang lawn mowers adapted for use to mow golf courses and other large turfs, and which are usually propelled by tractor.

In order that each mowing unit in a gang lawn mower may more perfectly follow the contour of an undulating turf, it is quite essential that the front driving wheels and the rear supporting roller thereof be closely coupled. The center of gravity of the side members and cutting elements of the mowing unit will be only a short distance behind the wheel axle, thereby causing the rear portion of the unit to be more easily lifted, but otherwise permitting the cutting edge of the cutter blade to more closely follow the surface of the ground, even though its surface be uneven and undulating, resulting in the turf being cut to substantially a uniform length.

When a gang lawn mower is towed by a tractor, as is common, and the moving units thereof are in operation cutting grass, there is considerable resistance at the cutting edge of the cutter blade of each unit, tending to retard the unit, and this resistive force is transmitted through the gearing and associated parts to the drive wheels thereof, causing the peripheries of the wheels to tend to slip or slide upon the ground, as the unit is pulled forwardly thereover. The force acting on the tractive surfaces of the drive wheels of each unit, when the moving unit is in operation, is therefore in a backward direction and constitutes the principal force which has to be overcome in towing the mower unit.

The units of gang lawn mowers are usually each provided with a draw bar, whereby the units may be connected to a suitable draft frame coupled to a prime mover such as a tractor. The draw bar with which each unit is provided and by means of which it is towed, has heretofore frequently been pivotally attached to the drive wheel axle of the unit. Therefore, because of the drive wheels being component parts of the unit upon which a backward force is acting at the ground, the draw bar force acting in a forward direction, acts upon a relatively long lever arm (the vertical height from the ground to the point of drawbar connection) tending to tip the top of the unit forwardly and the back or rear end portion thereof upward. For this reason, the cutting elements in such mower units frequently have a tendency to jump or bob up and down when the mower is in operation, resulting in uneven cutting. In some cases, because of the resistance between the cutting elements of the unit, the rear portion of the mower unit may be swung upwardly and thrown completely over out of engagement with the ground surface so that the cutting elements will not engage the turf or grass, leaving spots in the turf which have not been mowed. This upward force acting to lift the rear portion of the unit has a greater effect upon a short coupled cutting unit because of the center of gravity of the rear portion of the unit being disposed relatively close to the drive wheel axle, and has heretofore prevented such short coupled units from being towed in gangs.

It is the purpose of this invention to provide a short coupled mower unit constructed in such a manner that it may be towed without danger of the rear portion thereof jumping or tending to lift off the ground while the mower is in cutting operation. To overcome this upward force tending to lift the rear portion of the mower unit, I provide an improved draft mechanism including a draw bar, the rear portions of which are pivotally connected with the lower portions of the side members of the unit, so as to bring the pivotal connections of the draft bar with the unit close to the ground surface, whereby said upward force will be minimized upon the rear portion of the mower unit when in cutting operation. By thus connecting the draft bar with the mower unit, the lifting of the rear portion of the mower unit is overcome and also a short coupled mower unit becomes entirely feasible, and superior cutting is made possible.

Other important features of the invention reside in the connection of the forward end of the draft bar with the draft frame or truck, which includes a ball-and-socket joint permitting free universal movement of each unit so that it may accurately follow the contour of the ground, and whereby the rear units of the gang may swing laterally when traveling around curves; in the location of the ball-and-socket joints connecting the rear units with the draft frame, whereby the cutting width of each rear unit will uniformly overlap the individual swaths of the front units of the gang, when traveling around curves as well as when traveling in a straight line; in the construction of the draw bars of the various units which are similar in construction, whereby manufacturing costs are minimized; in the means provided for exerting a downward force upon the rear ends of the draw bars to assist in holding the drive wheels in contact with the ground and prevent slipping of the wheels when traveling over places in the turf where cutting resistance is increased; in the means provided for holding each outer hinged unit in an elevated inoperative position whereby, when each of these units is lowered to an operative position, the outer wheel of the unit will engage the ground before the inner wheel thereof, thereby preventing the inner wheel from digging into the turf when the unit is lowered to an operative position; and in the means whereby the front units will resist skidding or side slipping of the draft frame, even though the latter are free to oscillate both longitudinally and transversely.

The particular object of the invention, therefore, is to provide an improved mowing unit and means for connecting the units of a gang lawn mower.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

Figure 3:
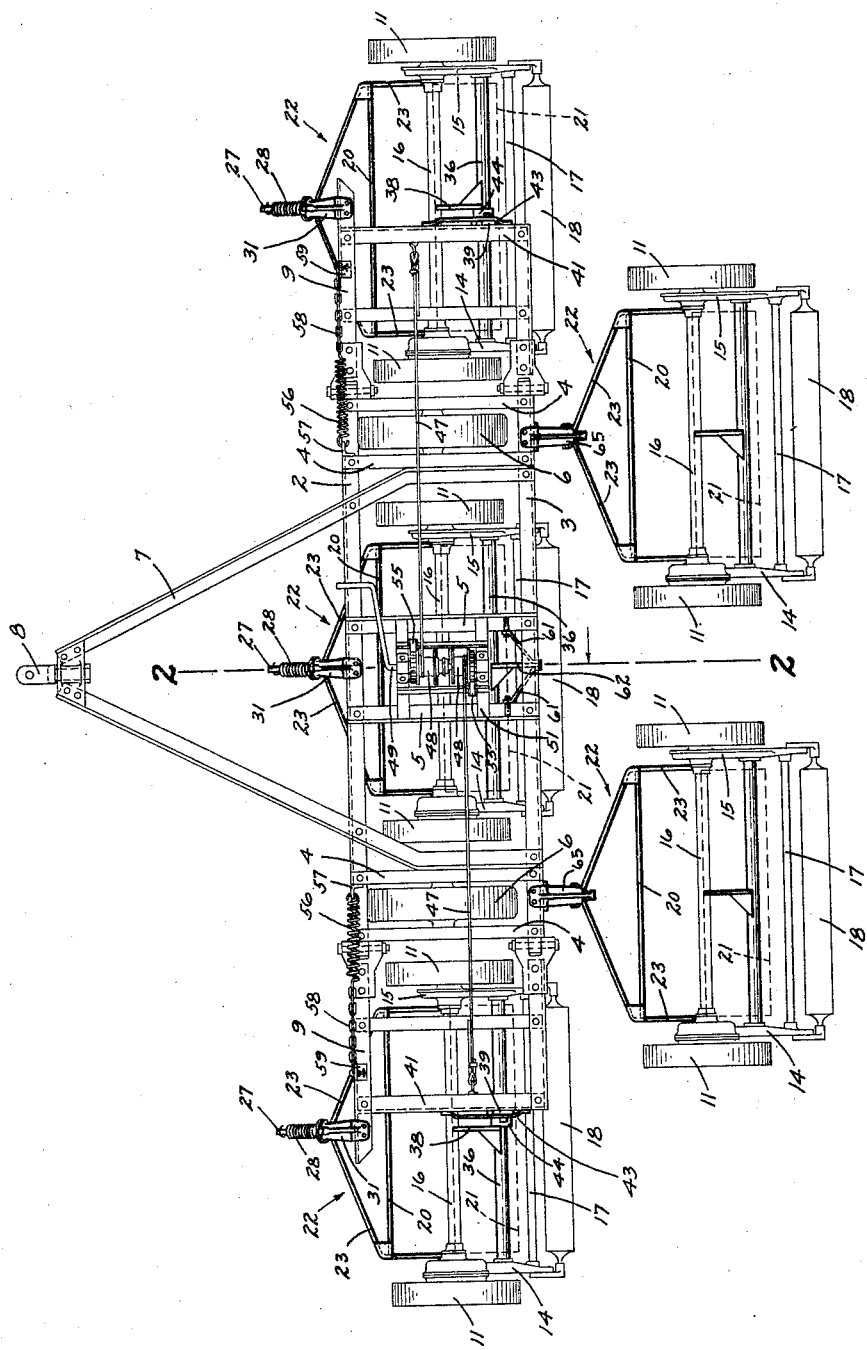
Figure 3 is a plan view showing the relative positions of the mowing units when connected with the draft frame or truck.

In the selected embodiment of the invention here shown, there is illustrated in Figure 3, a gang lawn mower comprising five mowing units, all of which are similar in construction. These units are movably connected to a two-wheeled truck comprising a frame, including front and rear members 2 and 3 secured together by suitable cross members 4 and 5. The draft frame is supported upon suitable carrying wheels 6. Suitable draft members 7 are secured to the draft frame and extend forwardly and have a suitable clevise or coupling 8 movably mounted in the outer end thereof, whereby the draft members may be connected to a tractor.

The draft frame is provided at each end with a hinged section 9 which supports the outer mowing units, as will be clearly understood by reference to Figure 3. As the mowing units are of like construction, but one will be described in detail.

Figure 1:
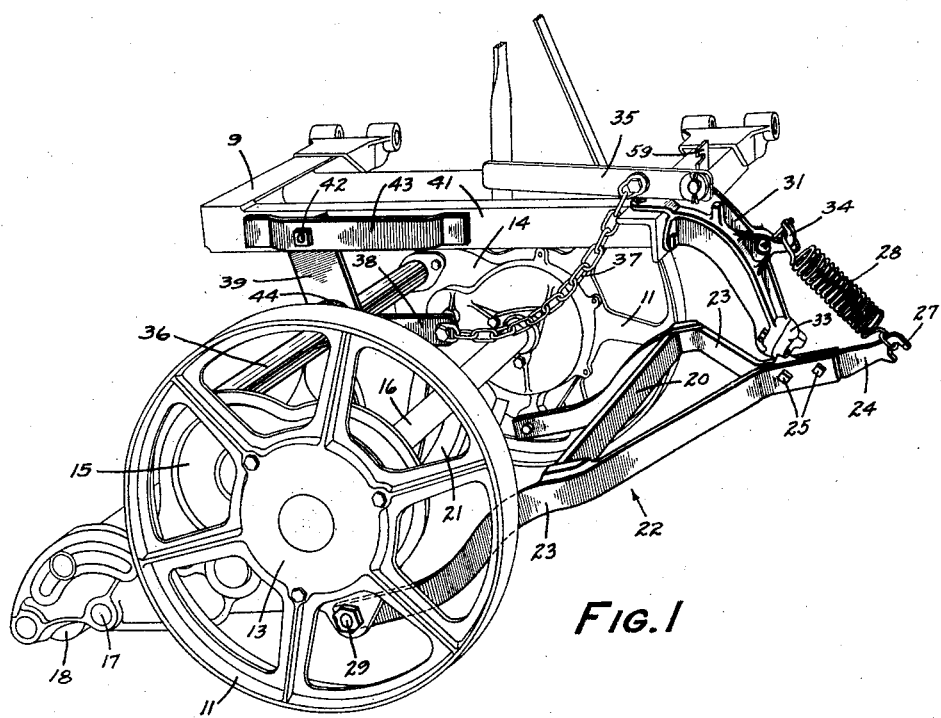
Figure 1 is a perspective view showing the end unit of a gang lawn mower with the novel draft means shown in heavy lines.
Figure 2:
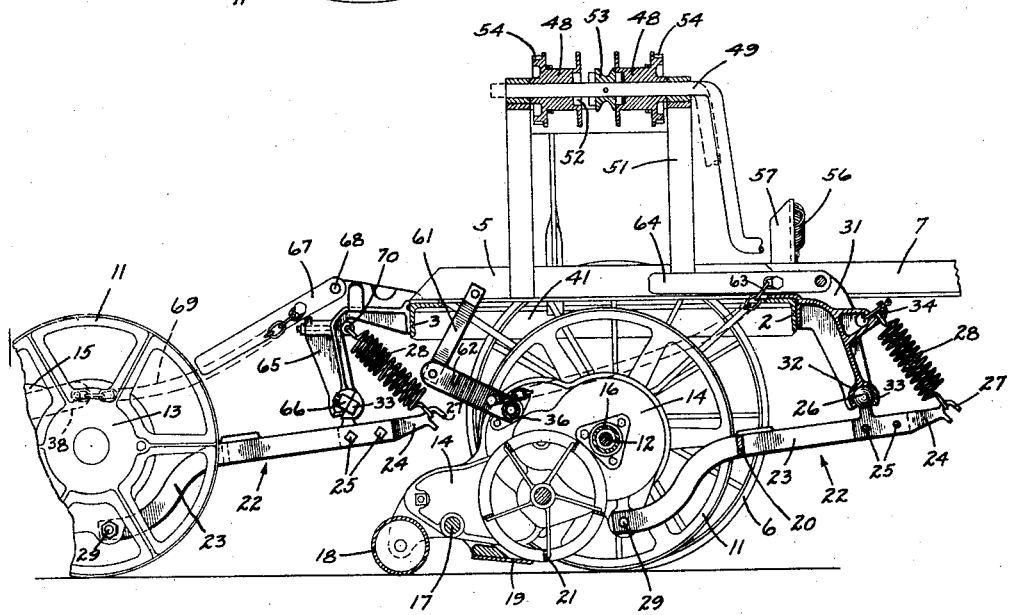
Figure 2 is a vertical sectional view on the line 2—2 of Figure 3, illustrating the universal connections of the mower units with the draft frame or truck.

Each mowing unit comprises a pair of drive wheels 11—11 operatively connected with an axle 12 by suitable ratchet mechanisms common in structures of this kind, and which it is thought unnecessary to show in detail in the drawings. These ratchet mechanisms are situated within the enlarged hubs 13 of the drive wheels, shown in Figures 1 and 4. Each unit further comprises a pair of side frames 14 and 15 secured together in spaced relation by means of a tubular tie member 16, which also provides a housing for the axle 12, and a tie rod 17 located adjacent the supporting roller 18 provided at the rear end portion of the unit. The usual cutter blade 19 and reel 21 are shown supported between the side frames 14 and 15, as best shown in Figure 2.

An important feature of this invention resides in the means provided for connecting the mowing units with the wheeled draft frame. Each unit is provided with a draw bar 22 comprising spaced apart members 23 having their forward portions bent inwardly and secured to a bracket 24 by means of bolts 25. Each bracket 24 is provided at its rear portion with a ball 26, and its forward portion is preferably provided with a hook 27 adapted to receive one end of a suitable spring 28. The rear end portions of the members 23 of the draw bar 22 are pivotally connected with the side frame members 14 and 15 of the mower unit by suitable pivots or bolts 29. These pivots are situated considerably below the axis of the drive axle 12, and preferably slightly forwardly thereof, as shown in Figure 2. By thus connecting the draw bar with the mower unit, in combination with the spring 28, a downward force is transmitted to the unit acting to cause the drive wheels 11 to be non-slippingly engaged with the ground when the mower is in operation. The tendency of the rear portion of the mower unit bobbing up and down or lifting, when the mower is in operation, is also eliminated by locating the pivots 29 low enough so that the weight of the rear portion of the mower is never overcome by resistance of the cutting elements. The spaced members 23 of the draw bar may be connected together at their intermediate portions by a suitable cross member 20.

A simple and direct method of ascertaining whether or not the pivotal points 29, where the drawbar members 23 are connected to the side members of the cutting unit, are low enough to avoid lifting the rear portion of the cutting unit, and therefore low enough to come within the scope of this invention, is by the following test. Place an obstruction in the cutting knives of the unit so that they become locked with the drive wheels in gear. Then, with the cutting unit hitched to the draft frame in the prescribed manner, and with the unit on a normal turf footing, pull the draft frame forward. If the points of pivotal connection 29 are low enough, the drive wheels will slip on the turf and the rear portion of the cutting unit will not lift. If they are not low enough, the rear portion of the cutting unit will lift until it meets some obstruction before slippage occurs.

Figure 4:
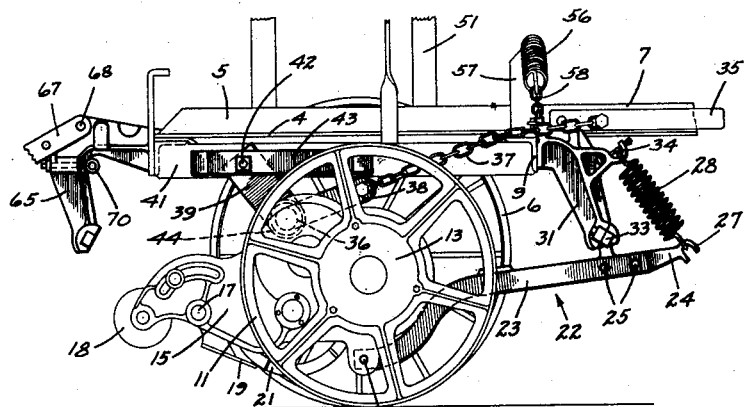
Figure 4 is an end view of one of the end units showing the cutting elements and rear supporting roller lifted out of engagement with the ground.

The front mower units of the gang are connected with the draft frame by means of brackets 31 secured to the front rail 2 of the draft frame and to the hinged end sections 9 thereof, and extending forwardly and downwardly therefrom. A spherical seat is provided at the lower end of each bracket 31 adapted to receive the balls 26 provided upon the draw bars 22 of the units, whereby a universal connection is provided between each unit and its respective bracket 31. To facilitate connecting the units with the brackets 31, the spherical seats 32 are preferably split, and each has a removable cap 33, as shown in Figures 1 and 4.

The springs 28 of the front units are shown having their upper ends attached to suitable hooks 34 provided at the upper portions of the brackets 31, whereby the springs will be under tension to constantly exert a downward force upon the rear ends of the draw bars 22 to hold the drive wheels 11 of the units in engagement with the ground for the purpose of preventing slipping of the wheels when engaging a wet or slippery spot in the turf, or a spot where cutting resistance is increased.

Means are provided for swinging the rear end portions of the side frames of each unit upwardly to move the cutting elements out of contact with the grass, as when moving from one place to another over a golf course. Each end mower is provided with a lever 33 pivoted to the end brackets 31 and having a connection with a lifting bar 36 provided at the upper intermediate portions of the side frames 14 and 15, by means of a flexible connection such as a chain 37. One end of the chain 37 is connected to the lever 35 and its opposite end to an arm 38 secured to the lifting bar 36 by such means as welding. In Figure 1, the lifting lever 35 is shown in the position assumed when the cutting elements are in operative position with respect to the ground, while in Figure 4, the lever is shown in the position assumed when the rear end portions of the side frames of the unit have been swung upwardly to move the cutting elements out of operative relation with respect to the ground. The lever is retained in the position shown in Figure 4 because of the chain 37 passing over the center or axis of the pivot supporting the lever 35 upon the bracket 31. Means, not shown, may be provided on the unit for disengaging the drive to the cutting elements when the unit is thus being transported.

Means are provided at the rear of each end unit for limiting the lateral swinging movement thereof with respect to the draft frame. Such means is shown in Figures 1, 3, 4, 5, and 6, and consists of an arm 39 pivoted to the adjacent end rail 41 of the hinged frame section 9 of the draft frame, by means of a pivot 42 engaged with a metallic strap 43 secured to the end rail 41 in spaced relation thereto, as shown in Figure 1. The upper end of the arm 39 is supported between the strap 43 and the end rail 41, whereby lateral swinging movement of the arm is limited. The lower end of each arm 39 is provided with a bearing portion 39$^a$ and a tubular portion 44 which surrounds the lifting bar 36. The arm 39 and portion 44 are positioned between a collar 45 and the arm 38 secured in fixed relation to the lifting bar 36. By thus connecting each end unit with the draft frame, the end units are retained in such position when turning corners as to assure that there will be no lateral slipping or skidding of the draft frame truck, and that the swaths made by the trailing rear units will overlap the swaths made by the leading forward units, so that the resultant single swath made by the five units will be uniform and free from ridges.

Figure 6:
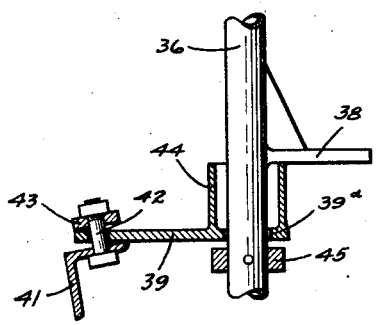
Figure 6 is an enlarged detail sectional view showing the means for supporting the end units when swung to elevated inoperative positions.
Figure 5:
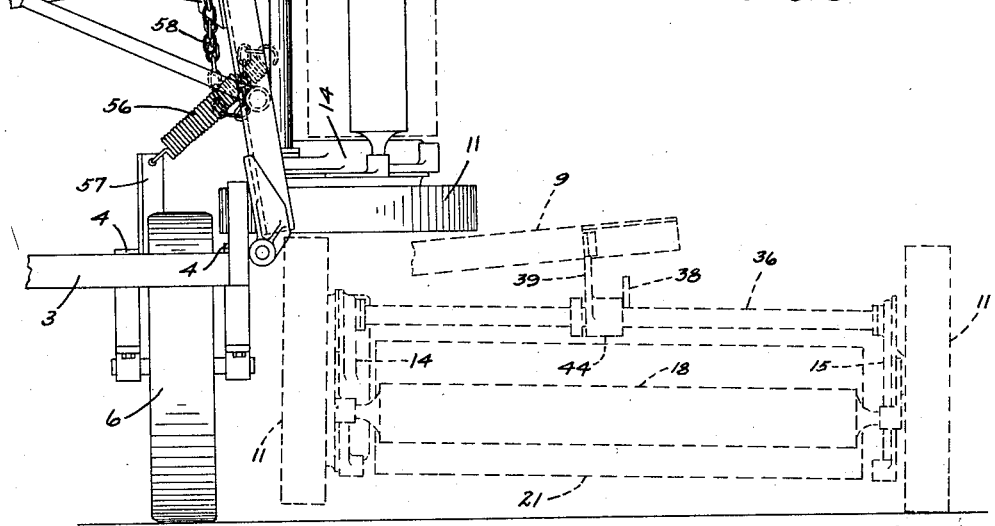
Figure 5 is a view illustrating in full lines, one of the end units swung to an inoperative position, and indicating in dotted lines the position of the unit as it is lowered into engagement with the ground.

The means for limiting lateral swinging movement of the end units with respect to the draft frame have dual functions to perform, in that said means also support the units when the latter are swung to upright inoperative positions, as shown in Figures 5 and 6. The end units are attached to the hinged frame sections 9 so that they may be swung upwardly to the position shown in full lines in Figure 5 to permit the apparatus to pass through ordinary gates, and whereby the end units may also be swung upwardly to clear obstructions encountered on the golf course as, for example, trees, sand traps, and other obstructions.

Cables 47 are secured to the hinged sections 9 of the draft frame to which the end units are attached, and these cables are operatively connected with suitable winding drums 48, mounted upon a crank shaft 49 supported upon an upright frame 51 shown provided upon the central portion of the draft frame. As shown in Figure 2, each winding drum is provided at its inner end with suitable clutch teeth 52 adapted to be selectively engaged by a clutch member 53 secured to the crank shaft 49. The crank shaft is adapted for axial movement whereby the clutch member 53 may be selectively moved into and out of engagement with the clutch teeth 52 provided upon the winding drums 48. The winding drums may be provided at their outer ends with ratchet teeth 54 adapted to be engaged by pawls 55 pivotally mounted upon the super frame 51. By means of the winding mechanism above described, the end units may be quickly swung upwardly to inoperative positions, as shown in Figure 5.

When an end unit is swung upwardly to the position shown in full lines in Figure 5, the major portion of its weight will be supported upon the arm 39 which, as hereinbefore stated, is pivotally connected at one end to the end rail 41 of the hinged section. The arm 38 secured to the lifting bar 36 will bear against the upper end of the tubular portion 44 of the arm 39, as shown in Figure 6, when the mower is in the position shown in full lines in Figure 5. The bearing portion 39ª, (Figure 6), of the arm 39 engages the lifting bar 36 at a point offset from the center line of the unit so that when the unit is lowered to an operative position in engagement with the ground, gravity will cause the outer wheel to engage the ground before the inner wheel, thereby preventing the inner wheel from digging into the turf when the mower is lowered to its operative position, see Figure 5.

A suitable spring 56 has one end connected to an upright 57 provided upon the main portion of the draft frame, and its opposite end is connected with one end of a chain 58, the opposite end of which is adjustably attached to the hinged section 9 by a suitable hook 59, shown in Figure 5. This spring counteracts the weight of the end frame section, whereby the operation of lifting the same to the full line position shown in Figure 5 is facilitated.

The means for limiting the lateral swinging movement of the center unit is shown in Figure 2 and 3, and consists of a pair of arms 61 having their upper ends pivotally connected with the cross members 5 of the main draft frame, and their rear portions extending downwardly and loosely connected with a link 62 having its forward end rigidly attached to the lifting bar 36 of the center mower unit. The lifting bar 36 is pivotally connected to the side members 14 and 15 of the center mowing unit, as are also the bars 36 in the other units. In this manner, the center unit may move vertically and is permitted free oscillation with respect to the draft frame, in all directions except laterally. A lifting chain 63, indicated in dotted lines in Figure 2, has its rear end suitably attached to the arm 62 adjacent to the bar 36, and its forward end connected with a suitable lever 64, whereby the rear portion of the center unit may be swung upwardly to move the cutting elements out of operative relation with the ground.

The rear units are connected with the main draft frame by means of rearwardly and downwardly extending brackets 65 secured to the rear rail 3 of the draft frame, as best shown in Figure 2. The rear units are connected with the brackets 65 by means of ball-and-socket joints 66 which permit free universal movement of the units with respect to the main draft frame, and whereby the units may closely follow the contour of the turf. Springs 28 connect the forward end portions of the draft bars 22 of the rear units with the brackets 65, as shown, so that a downward force is constantly exerted upon the mower unit in a manner similar to that shown and described with reference to the forward units. The rear portions of the trailing units may be swung upwardly, as shown in Figure 4, to move their cutting elements out of operative relation with respect to the ground, by means of suitable hand levers 67 pivotally connected to the brackets 65 as at 68, and having flexible connections 69 connecting them with the arms 38, secured to the lifting bars 36 provided upon the rear units. The rear upper ends of the springs 28 for the rear units are pivotally connected at 70 to the brackets 65, the connections 70 being substantially vertically alined with the ball-and-socket joints 66, so that each rear unit and its draw bar may swing laterally about its respective joint 66 without materially altering the tension of the spring 28.

By connecting the mower units with the draft frame or truck as herein described, a gang lawn mower is provided which will cut a uniform and smooth swath, regardless of whether it is traveling over uneven, undulating or smooth even turf, because of the draw bars of the individual units being connected to said units at points situated considerably below the axes of the drive wheel axles of the various units, and because the horizontal distance between the axle and the rear supporting roller of each unit may be made relatively shorter than is possible when the draft bars are connected directly or adjacent to the drive wheel axles. This results because of the fact that the weight of the rear portion of each unit will then more than counteract the reduced force tending to lift the rear end of the unit, resulting from the forward pull of the draft members, and from the resistance of the cutter elements and the driving connections between the reel and the drive wheels. Also, by shortening the distance between the axle and the rear supporting roller of each unit, as hereinbefore stated, the cutting elements will be maintained in substantially uniformly close relation to the surface of the ground, even though the unit be passing over uneven turf. This is important in that it assures that the grass or turf will be cut to a uniform length, which is very desirable to the maintenance of golf courses and other turfs. The means for preventing lateral swinging movement of the leading units is also important in that it assures that the wheeled draft frame will not skid, and that the individual swaths of the trailing units will overlap the individual swaths of the leading units so as to prevent the formation of ridges in the finished or mowed turf.

In the drawings, I have shown the draft frame as having a hinged section at each end thereof to which the end mowing units of the front row of units are connected. It is to be understood, however, that in some instances, it may be desirable to eliminate the hinged end sections and use an extended draft frame of rigid construction to which all of the mowing units in the front row are directly connected by means of suitable draw bars such as herein shown and described. When a rigid draft frame is used in lieu of a frame having hinged end sections, the rear portions of the end mowing units may be connected to the rear portion of the draft frame by some construction similar in principle to the links 61 and arms 62, herein shown in connection with the centrally disposed forward unit. (See Figure 2.)

I claim as my invention:

1. The combination with a lawn mowing unit including spaced-apart drive wheels, and a propellant for said unit, of a draft member for connecting the unit with said propellant, said draft member having a pivotal connection with said unit situated at a substantial distance below the axis of said drive wheels, means pivotally connecting the draft member with said propellant, and means connected between said draft member and said propellant adapted to exert a downward pressure on the drive wheels of the mowing unit.

2. The combination with a lawn mowing unit including spaced-apart wheels, and a propellant for said unit, of a draft member for connecting the unit with said propellant, said draft member having pivotal connections with said unit situated at a substantial distance below the axis of said drive wheels, means connecting the draft member with said propellant and permitting universal swinging movement thereof, and tension means connected between said draft member and said propellant adapted to constantly exert a downward pressure on the drive wheels of the mowing unit.

3. Means for coupling a lawn mowing unit to a draft frame, said means comprising a draw bar having a pivotal connection with said unit situated substantially directly below the axis of the drive wheels thereof, means providing a universal connection between the draw bar and said draft frame and permitting oscillation of said unit in a plurality of vertical planes, and a spring connected between said draw bar and said draft frame adapted to exert a downward pressure on the drive wheels of the mowing unit.

4. Means for coupling a lawn mowing unit to a draft frame, said means comprising a draw bar having a pivotal connection with said unit situated at a substantial distance below the axis of the drive wheels thereof, a ball-and-socket joint connecting said draw bar with said draft frame and permitting oscillation of said unit in a plurality of vertical planes, and a spring connected between said draw bar and said draft frame adapted to exert a downward pressure on the drive wheels of the mowing unit.

5. In a gang lawn mower, a mowing unit including drive wheels and a rear supporting member situated relatively close to the axis of said drive wheels, cutting elements disposed between said drive wheels and said rear supporting member and adapted to be operated by said drive wheels, and a draw bar having its rear portion pivotally connected with said mowing unit at such a height from the ground below the axis of said drive wheels that a draft force applied to said draw bar in a forward direction will slip the drive wheels on a normal lawn surface before lifting the weight from the rear supporting member, regardless of the resistance of the cutting elements.

6. In a gang lawn mower, a draft frame, a mowing unit comprising side frame members having drive wheels and a rear supporting member situated relatively close to the axis of said drive wheels, cutting elements disposed between said drive wheels and said rear supporting member and adapted to be operated by said drive wheels, and a draw bar pivotally connected to the side members of said unit and to said draft frame, a spring connected between said draw bar and said draft frame whereby a downward pressure is applied by the draw bar to the unit at the points of pivotal connection with the side frames thereof, said points of pivotal connection being situated at a substantial distance below the axis of said drive wheels and at such a low position that the combined forces exerted upon the mowing unit by the action of said spring and the forwardly acting draft force applied to said draw bar cannot lift the weight from the rear supporting member before the drive wheels slip on a normal lawn surface, regardless of the resistance of the cutting elements.

7. In a gang lawn mower, a mowing unit including drive wheels and a rear supporting member situated relatively close to the axis of said drive wheels, cutting elements disposed between said drive wheels and said rear supporting member and adapted to be operated by said drive wheels, and a draw bar having its rear portion pivotally connected with said mowing unit at such a low height from the ground below the axis of said drive wheels that a forwardly acting draft force applied to the draw bar will, if the cutting elements are locked, cause the drive wheels to slip on a normal operating surface before lifting the weight from the rear supporting member.

8. In a gang lawn mower, a draft frame, a mowing unit comprising side frame members having drive wheels and a rear supporting member situated relatively close to the axis of the drive wheels, cutting elements disposed between said drive wheels and rear supporting member and adapted to be operated by said drive wheels, a draw bar pivotally connected to the side members of said unit and to said draft frame, a spring connected between said draw bar and said draft frame, whereby a downward pressure is applied by the draw bar to the unit at the points of pivotal connection with the side frames thereof, said points of pivotal connection being situated at a substantial distance below the axis of said drive wheels and at such a low position that the combined forces exerted upon the mowing unit by the action of said spring and the forwardly acting draft force applied to said draw bar will, if the cutting elements are locked, cause the drive wheels to slip on a normal operating surface before lifting the weight from the rear supporting member.

9. In a gang lawn mower, a draft frame, a plurality of mowing units arranged in a row lengthwise of said frame, a draw bar for each unit, said draw bars having their rear portions pivotally connected with their respective units at points at a substantial distance below the axes of the drive wheels of said units, the forward portion of each draw bar having a universal connection with said draft frame whereby each unit is permitted to follow the contour of the ground, means connecting the rear portion of one of said mowing units with said draft frame, comprising members pivotally connected to the draft frame and an element pivotally mounted upon the unit, said members and element being pivotally connected together to permit vertical movement of the unit with respect to said draft frame and also oscillation of the unit in two vertical planes, but resisting lateral swinging movement of the unit in a horizontal plane.

10. In a gang lawn mower, a draft frame, a plurality of mowing units substantially alined with said frame in a direction lengthwise thereof, a draft bar for each unit, each having its rear portion pivotally connected with its respective unit at points substantially directly below the axis of the drive wheels of the unit so as to permit fore-and-aft oscillation of the unit, the forward portions of said draft bars having pivotal connections with the draft frame permitting universal movement thereof, means comprising a link having a pivotal connection with the rear portion of one of said mowing units and also having a pivotal connection with said draft frame, the pivotal connection between said link and said draft frame being on a transversely disposed axis whereby lateral swinging movement of the link and unit relative to said draft frame is resisted, said connection permitting fore-and-aft movement of the unit, and also oscillation thereof in two vertical planes.

11. In a gang lawn mower, a draft frame having a plurality of mowing units connected thereto in front and rear rows, a draw bar for each unit, said drawbars having their rear portions pivotally connected with their respective units at points situated at a substantial distance below the axes of the drive wheels of said units, the forward portions of said draw bars being pivotally connected with said draft frame by means of universal connections, and means comprising lifting bars connecting the rear portions of the units in the front row with said draft frame adapted to permit fore-and-aft movement of each of said front units and also oscillation thereof in two vertical planes, but resisting lateral swinging movement of said units in a horizontal plane.

12. In a gang lawn mower, a draft frame provided with a hinged end section, a mowing unit pivotally connected with said hinged end section and adapted to oscillate transversely to its line of travel, said unit being adapted to be swung upwardly to an inoperative position by swinging movement of said hinged end section, and the pivotal connection between said hinged end section and said mowing unit being disposed inwardly from the center of gravity of the unit whereby, when the hinged section is actuated to lower the mowing unit to an operative position, the outer drive wheel of the unit will engage the turf before the inner drive wheel thereof, for the purpose specified.

13. In a gang lawn mower, a draft frame provided with a hinged end section adapted to be carried in an upright position, a mowing unit, a draw bar pivotally connected to the mowing unit at points situated substantially directly below the axis of the drive wheels thereof, when the unit is in an operative position, the forward portion of said draw bar being pivotally connected with said hinged end section at a point forwardly thereof and adapted for oscillatory movement, and means associated with said end section and said mowing unit for supporting the mower unit on said end section when the latter is swung to an upright position, said means also being operative to prevent the mower unit from swinging laterally in a horizontal plane but allow it to move in a fore and aft direction and to oscillate in vertical planes, when the end section and unit are in operative position.

14. In a gang lawn mower, a draft frame, a mowing unit, a draw bar having its rear end portion pivotally connected with said units and its forward portion pivotally connected with said draft frame, a spring having one end connected to said draw bar and its other end pivotally connected to said draft frame at a point substantially vertically alined with the pivotal connection between the forward portion of the draw bar and said draft frame, whereby said unit and its draw bar may swing laterally with respect to said draft frame without materially altering the tension in said spring.

15. In a gang lawn mower, a draft frame provided at one end with a hinged section adapted to be swung to an upright position, a mowing unit, a draw bar pivotally connected to said mowing unit and extending forwardly thereof, and having a universal connection with said hinged section, a pivotally mounted lifting bar on said unit situated rearwardly thereof, an arm having one end pivoted to the rear portion of said hinged section and having its opposite end pivotally connected with said lifting bar at a point offset laterally from the center of gravity of the mowing unit, abutments on said lifting bars between which said pivoted arm is disposed, means for actuating said hinged frame section to lift the mowing unit to an elevated inoperative position, said arm being adapted to support a portion of the weight of said unit when thus elevated, and also causing the outer wheel of the mowing unit to engage the turf before the inner wheel thereof, when said unit is lowered to an operative position, and the connections of said arm with said hinged section and the lifting bar of said unit resisting lateral swinging movement of said unit with respect to the draft frame.

16. In a gang lawn mower, a draft frame provided at one end with a hinged section adapted to be swung to an upright position, a mowing unit, a draw bar pivotally connected to said mowing unit at a point situated at a substantial distance below the axis of the drive wheels of said unit, and extending forwardly thereof and having a universal connection with said hinged section at a point forwardly thereof, a pivotally mounted lifting bar on said unit situated rearwardly thereof, an arm having one end pivoted to the rear portion of said hinged section on a transverse axis and having its opposite end pivotally connected with said lifting bar at a point offset laterally from the center of gravity of the mowing unit, abutments on said lifting bars between which said pivoted arm is disposed, means for actuating said hinged frame section to lift the mowing unit to an elevated inoperative position, said arm being adapted to support a portion of the weight of said unit when thus elevated, and also causing the outer wheel of the mowing unit to engage the turf before the inner wheel thereof, when said unit is lowered to an operative position, and the connections of said arm with said hinged section and the lifting bar of said unit resisting lateral swinging movement of said unit with respect to the draft frame, but permitting fore-and-aft movement of the unit and also oscillation thereof in two vertical planes.

17. In a gang lawn mower, a draft frame, a plurality of mowing units disposed beneath said frame and arranged in a row lengthwise thereof, a plurality of similar units arranged behind said draft frame, independent draw bars for connecting said units to said frame, said draw bars having their rear portions pivotally connected to their respective units at points substantially directly below the axes of the drive wheels of said units so as to overcome the lifting of the rear portions of said units, and means comprising lift bars operatively connecting the rear portions of the front mowing units to said draft frame adapted to resist lateral swinging movement of said front units, but permitting fore-and-aft movement thereof and also oscillation thereof in two vertical planes, said rearwardly disposed mowing units being individually permitted free lateral swinging movement, and all of said drawbars having resilient means exerting a downward pressure supported by the drive wheels of the several units.

18. The combination with a lawn mowing unit having a cutter operated by a rolling drive member by means of a propellant, of a drawbar pivoted to said unit in a plane at a relatively low height from the ground and pivoted in front thereof to said propellant in a substantially higher plane, and means engaged between said propellant and drawbar for exerting a downward pressure on said unit-connecting pivot.

19. The combination with a lawn mowing unit having a cutter-driving rolling member, of a drawbar pivotally engaged to said unit and to a propellant, and means engaged between said propellant and drawbar for exerting a downward pressure upon said unit and rolling member.

20. The combination with a lawn mowing unit having a cutter operated by a rolling drive member, of a drawbar pivoted to said unit substantially in the vertical plane of the axis of said drive member and universally engaged in front thereof to a propellant, and means engaged between said propellant and drawbar for exerting a downward pressure upon said unit.

21. In a gang lawn mower, a draft frame, rolling elements for supporting said draft frame, a mowing unit including drive wheels and a rear supporting member relatively close to the drive wheel axis, said mowing unit further having cutting elements disposed between said drive wheels and said rear supporting member and adapted to be operated by said drive wheels, and a draw bar having its rear portion pivotally connected with said mowing unit at such a height from the ground below the axis of said drive-wheels that a draft force applied to said draw bar in a forward direction cannot lift the weight from the rear supporting member before the drive wheels slip on a normal lawn surface, regardless of the resistance of the cutting elements.

22. In a gang lawn mower, a mower unit including drive wheels and a rear supporting member situated relatively close to the axis of said drive wheels, cutting elements disposed between said drive wheels and said rear supporting member and adapted to be operated by said drive wheels, a draft frame, means for supporting said draft frame from the ground independently of said mower unit, and a draw bar having its rear portion pivotally connected with said mowing unit at such a height from the ground below the axis of said drive-wheels that a draft force applied to said draw bar in a forward direction cannot lift the weight from the rear supporting member before the drive wheels slip on a normal lawn surface, regardless of the resistance of the cutting elements.

23. In a gang lawn mower, a draft frame, a plurality of mowing units each comprising two side members and disposed beneath said frame in a front row transverse to the direction of travel, drawbars pivotally engaged to the side members of the several units on transverse axes, and each universally engaged to the draft frame at a point ahead of its respective mowing unit, means comprising a universal connection disposed at the rear of each unit adapted to permit movement with respect to the frame in a vertical plane and to prevent lateral swinging of the unit and drawbar.

24. In a gang lawn mower comprising a front row of mowing units disposed transversely to the direction of travel, each unit comprising two side members and having a bifurcated drawbar pivoted thereto on a transverse axis, a universal draft connection on each of said drawbars located ahead of the respective unit, a draft frame uniting the universal draft connections whereby the units are drawn forwardly, and universally connected means pivoted to said frame at points horizontally displaced from said draft connections whereby said units and drawbars are held against lateral swinging.

In witness whereof, I have hereunto set my hand this 18th day of December, 1930.

AMOS F. MOYER.